(12) United States Patent
Boertjes et al.

(10) Patent No.: US 6,660,990 B2
(45) Date of Patent: Dec. 9, 2003

(54) OPTICAL AMPLIFICATION AND RECEIVING SYSTEM AND METHOD

(75) Inventors: David W. Boertjes, Nepean (CA); Gary Mak, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 265 days.

(21) Appl. No.: 09/870,634

(22) Filed: Jun. 1, 2001

(65) Prior Publication Data

US 2003/0042402 A1 Mar. 6, 2003

(51) Int. Cl.$^7$ ................................................. H01J 40/14
(52) U.S. Cl. ..................... 250/214 A; 359/341
(58) Field of Search ..................... 250/214 A, 214 LA, 250/214.1, 214 R; 330/59, 308, 309; 359/341, 333, 339, 152, 154, 173, 179, 188

(56) References Cited

U.S. PATENT DOCUMENTS 5,392,154 A * 2/1995 Chang et al. ............. 359/341.3
5,416,626 A * 5/1995 Taylor ......................... 359/156
5,923,450 A * 7/1999 Dugan et al. ............... 359/127

OTHER PUBLICATIONS

P.C. Becker et al., *Erbium–Doped Fiber Amplifiers: Fundamentals and Technology* (San Diego: Academic Press, 1999), pp. 214–215 and 220–223. Month unknown.

D. Derickson, ed., *Fiber Optic Test and Measurement*, (Upper Saddle River, NJ: Prentice–Hall Inc., 1998), pp. 533–534 and 538–539. Month unknown.

E. Desurvire, *Erbium–Doped Fiber Amplifiers: Principles and Applications* (New York: John Wiley & Sons, Inc. 1994), pp. 160, 165. Month unknown.

H. Haus, "Noise Figure Definition Valid From RF to Optical Frequencies", IEEE Sel. Topics in Quantum Electron., vol. 6, No. 2, Mar./Apr., 2000, pp. 240–247.

H. Haus, "The Noise Figure of Optical Amplifiers", IEEE Photon. Tech. Lett., vol. 10, No. 11, Nov., 1998, pp. 1602–1604.

E. Desurvire, "Comments on 'The Noise Figure of Optical Amplifiers'", IEEE Photon. Tech. Lett., vol. 11, No. 5, May, 1999, pp. 620–621.

G. Giuliani, P. Cinguino and V. Seano, "Multifunctional Characteristics of 1.5—micrometre Two–Section Amplifier–Modulator–Detector SOA", IEEE Photonics Technology Letters, vol. 8, No. 3, Mar. 1996, pp. 367–369.

* cited by examiner

*Primary Examiner*—Que T. Le

(57) ABSTRACT

Optical receiving methods and systems are disclosed. One such optical receiving system includes an optical amplifier operable to produce amplified optical signals satisfying a filterless detection specification limit, and an optical detector locatable in unfiltered communication with the optical amplifier to receive the amplified optical signals therefrom.

26 Claims, 5 Drawing Sheets

OPTICAL AMPLIFICATION AND RECEIVING SYSTEM AND METHOD

FIELD OF THE INVENTION

The present invention relates to optical communications, and more particularly to optical receiving systems and methods.

BACKGROUND OF THE INVENTION

In fiber optic communications networks, optical communications signals are typically transmitted in a plurality of closely-spaced communications channels within a broader communications band. For example, some optical network operators are presently using dense wavelength-division multiplexing (DWDM) to define a large number of discrete optical communications channels, such as 80 channels for example, at separate distinct wavelengths within the conventional or "C"-band, and to define similar numbers of optical channels in a long-wavelength or "L"-band, a short-wavelength or "S"-band, or both. As demand for data and voice communications bandwidth continues to increase, optical network operators are defining increasing numbers of discrete optical communications channels in available communications bands.

When a given optical communications channel reaches a destination point in the network at which it is to be converted into an equivalent electrical communications signal, the optical channel is typically separated (or more particularly, demultiplexed) from other channels in the band, and the optical channel is then passed to a receiver. The receiver typically includes a detector, which detects the optical signals in the channel, produces equivalent electrical signals, and amplifies the electrical signals.

However, the electrical detection process tends to introduce undesirable noise, referred to as shot noise, into the electrical signals, and similarly, the electrical amplification process tends to introduce undesirable thermal noise into the amplified electrical signals.

The relative amount of undesirable noise produced by the detection and electrical amplification processes tends to be inversely proportional to the strength of the incoming optical signals. Accordingly, one way of reducing the effects of shot and thermal noise would be to increase the strength of the incoming optical signals, by providing an optical pre-amplifier to amplify the optical signals prior to receipt by the receiver.

However, optical pre-amplifiers tend to introduce additional sources of noise. For example, rare-earth-doped optical amplifiers, such as erbium or thulium amplifiers, effectively amplify the optical signals in the desired channel by a stimulated emission process, however, a relatively small amount of undesirable amplified spontaneous emission (ASE), across a broader optical spectrum, also tends to occur. The inadvertently-produced ASE wavelengths tend to produce two main sources of noise in the optical signals, a narrow-band noise source and a wide-band noise source. The narrow-band noise source arises because ASE wavelengths in close proximity to the wavelength of the desired optical channel tend to "beat" with the optical signals in the desired channel itself, producing a source of noise referred to herein as "signal-spontaneous" beat noise. It will be appreciated that this signal-spontaneous beat noise only occurs in a relatively narrow wavelength range surrounding the wavelength of the channel itself.

The wide-band noise source arises due to the tendency of any given ASE wavelength to "beat" with any other nearby ASE wavelength, producing a source of noise referred to herein as "spontaneous-spontaneous" beat noise. As ASE wavelengths are produced across a broad optical spectrum, including wavelengths well outside the desired optical channel, such spontaneous-spontaneous beat noise may occur over a much broader wavelength range than signal-spontaneous beat noise. Any such spontaneous-spontaneous beat noise that occurs within the optical wavelength range to which the detector of the receiver is responsive, will produce corresponding beat noise in the equivalent electrical signals produced by the receiver.

To address this latter wide-band source of spontaneous-spontaneous beat noise, conventional wisdom dictates that an optical receiver must be provided with a filter interposed between any optical amplifier (or pre-amplifier) and the detector. The filter serves to pass only the wavelengths of the desired optical communications channel to the detector, and rejects other wavelengths, thereby rejecting most of the wavelengths at which spontaneous-spontaneous beat noise occurs (except to the minimal extent that such noise occurs within the optical channel itself).

One way of providing such a filter would be to place the optical pre-amplifier upstream of the demultiplexer used to separate the optical communications channels from one another, in which case the demultiplexer itself may serve as a filter to remove the wide-band spontaneous-spontaneous beat noise. However, the demultiplexer itself is typically a significant source of insertion loss in the optical signals due to the large number of filters it employs, and therefore, placing the demultiplexer downstream of all optical amplification would tend to weaken the optical signals, thereby partly defeating the purpose of pre-amplification, resulting in greater shot and thermal noise in the optical receiver.

Accordingly, it would be more desirable to place optical pre-amplifiers downstream of the demultiplexer, in which case the filter mandated by conventional wisdom to remove the wide-band spontaneous-spontaneous beat noise must be provided between the optical pre-amplifier and the detector. For example, such a filter may be provided as part of a receiver module including the optical pre-amplifier, followed by the filter which passes only the desired optical channel, followed by the detector.

However, providing such filters presents an expensive and inconvenient approach. It will be appreciated that a different filter is required for each one of the large number of optical communications channels in a given communications band, such as the 80 C-band channels and the 80 L-band channels presently used by some network operators, for example. This poses disadvantages for manufacturers, who must manufacture and stock a large number of different receiver filters or receiver modules containing such filters, each filter corresponding to a different respective optical communications channel.

Similarly, a number of disadvantages arise for network operators. Initial purchasing costs are increased, due to the added expense of the unique filter corresponding to each optical channel, required by each receiver or receiver module. In addition, network operators are typically required to maintain a spare part corresponding to each hardware component of the network. Thus, a network operator who uses 160 channels for example, must incur the cost of purchasing 160 different "spare" receiver modules or receiver filters, corresponding to each of the optical channels.

Accordingly, there is a need for an improved way of receiving optical signals.

SUMMARY OF THE INVENTION

The present invention addresses the above need by providing, in accordance with a first aspect of the invention, an optical receiving method. The method involves producing amplified optical signals satisfying a filterless detection specification limit, at an optical amplifier, and receiving the amplified optical signals at an optical detector in unfiltered communication with the optical amplifier.

Thus, certain specific embodiments of the above invention may provide a number of advantages. Significantly, it has been discovered that contrary to conventional wisdom, the optical detector may be placed in unfiltered communication with the optical amplifier in many circumstances, without suffering from significant wide-band spontaneous-spontaneous beat noise. Thus, a manufacturer may produce and stock a single filterless receiver module suitable for a large number of different optical channels, rather than a different filtered receiver module for each channel. Similarly, for optical network operators, the cost of initially acquiring the receivers may be significantly reduced due to the absence of filters, and the cost of maintaining spare parts may be even more greatly reduced, as a single spare receiver module may be suitable for a large number of different optical channels, rather than merely for a single unique corresponding channel. In addition, the reduction of shot and thermal noise in the detector resulting from amplification of the optical signals is further enhanced by the unfiltered communication between the amplifier and the detector. In this regard, a filter tends to produce at least some insertion loss, and therefore, the removal of the filter results in greater net amplification of the optical signals, and a correspondingly greater decrease in shot and thermal noise in the detector.

The method may involve producing the amplified optical signals to satisfy, as the filterless detection specification limit, a pre-defined maximum ratio of spontaneous-spontaneous beat noise to signal-spontaneous beat noise. For example, this maximum ratio may be on the order of one percent. Specific examples of such filterless detection specification limits are discussed in greater detail herein.

The method may further involve selecting a physical parameter of a system including the optical amplifier, to cause the amplified optical signals to satisfy the filterless detection specification limit. For example, this may involve selecting a noise figure of the optical amplifier, or a peak noise power parameter of the optical amplifier.

In accordance with another aspect of the invention, there is provided an optical receiving system including an optical amplifier operable to produce amplified optical signals satisfying a filterless detection specification limit, and an optical detector locatable in unfiltered communication with the optical amplifier to receive the amplified optical signals therefrom. The optical detector may include a plurality of optical detectors, each locatable in unfiltered communication with a respective one of a plurality of optical amplifiers, to receive amplified optical signals therefrom.

In accordance with yet another aspect of the invention, there is provided an optical receiving system including provisions for producing amplified optical signals satisfying a filterless detection specification limit, and provisions for receiving the amplified optical signals, in unfiltered communication with the provisions for producing.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
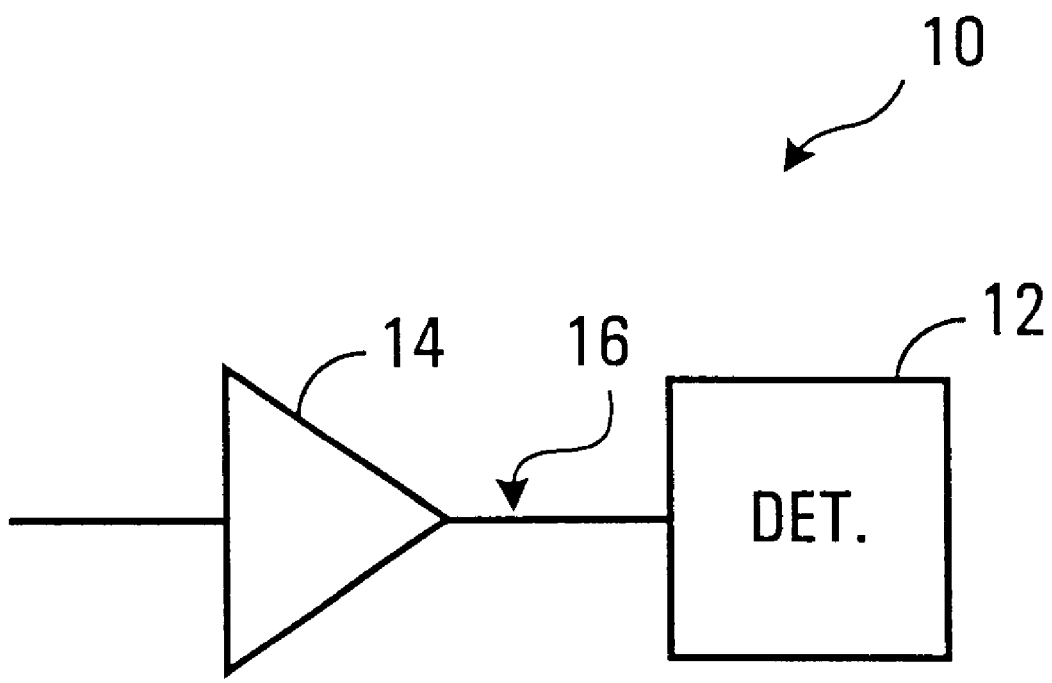
FIG. 1 is a block diagram of an optical receiving system, according to a first embodiment of the invention.

Referring to FIG. 1, an optical receiving system according to a first embodiment of the invention is shown generally at 10. The optical receiving system 10 includes an optical amplifier 14 operable to produce amplified optical signals satisfying a filterless detection specification limit, such as signals shown generally at 16 for example. The system 10 further includes an optical detector 12 locatable in unfiltered communication with the optical amplifier 14 to receive the amplified optical signals 16 therefrom.

Optical Network Segment Embodiment

Figure 2:
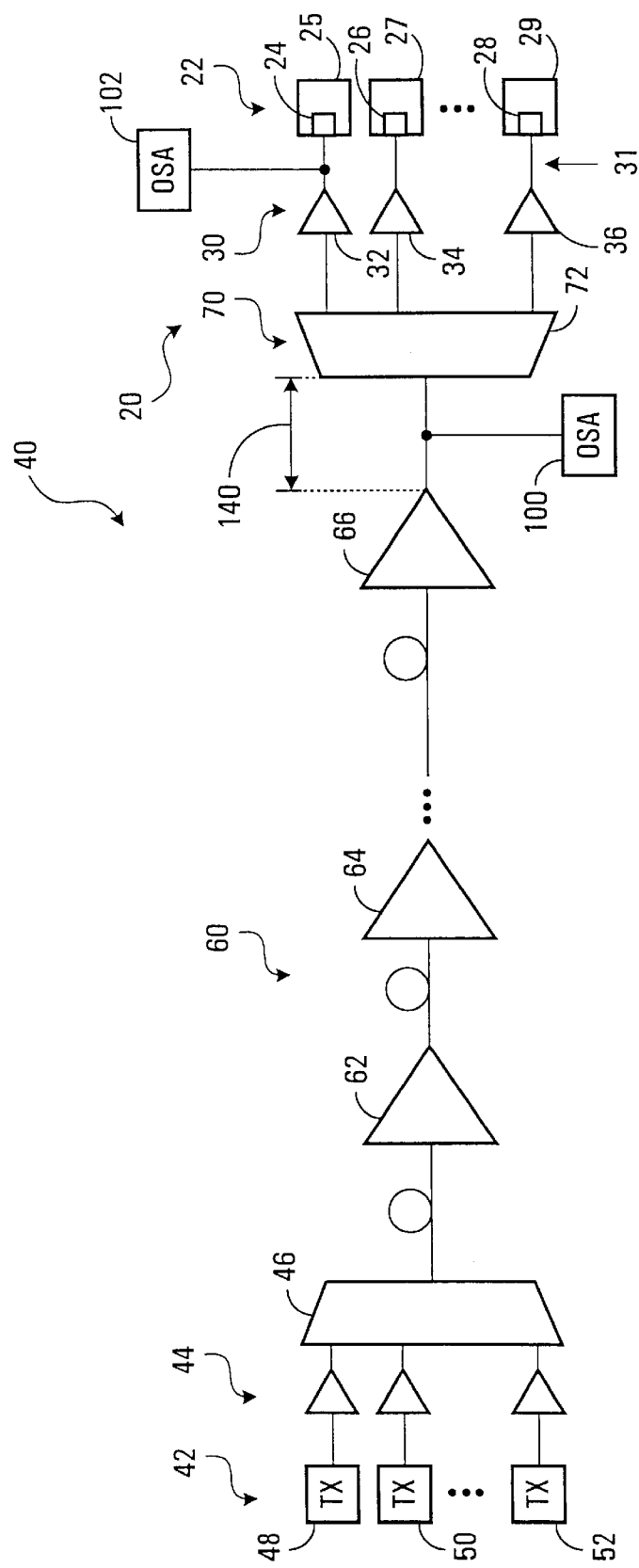
FIG. 2 is a block diagram of an optical receiving system and an optical network segment, according to a second embodiment of the invention.

Referring to FIG. 2, an optical receiving system according to a second embodiment of the invention is shown generally at 20. In this embodiment, the optical receiving system 20 includes an optical amplifier operable to produce amplified optical signals satisfying a filterless detection specification limit, and an optical detector locatable in unfiltered communication with the optical amplifier to receive the amplified optical signals therefrom. More particularly, in the present embodiment the optical detector includes a plurality of optical detectors shown generally at 22, and the optical amplifier includes a plurality of optical amplifiers shown generally at 30. In this embodiment, each of the optical detectors 22 is locatable in unfiltered communication with a respective one of the plurality of optical amplifiers 30, to receive amplified optical signals 31 satisfying a filterless detection specification limit therefrom.

In this embodiment the plurality of optical detectors 22 includes optical detectors 24, 26 and 28 and other similar optical detectors (not shown). In the present embodiment each of the plurality of optical detectors 22 is provided as a component of an optical receiver, such as those shown at 25, 27 and 29, and further optical receivers (not shown). Similarly, in this embodiment the plurality of optical amplifiers 30 includes optical amplifiers 32, 34 and 36 and other similar optical amplifiers (not shown).

In this embodiment the optical receiving system 20 is provided in the context of an optical network segment shown generally at 40. In this embodiment the optical network segment 40 includes a plurality of optical transmitters shown generally at 42, each of which is in communication with a corresponding one of a plurality of optical amplifiers 44, all of which are in communication with a multiplexer 46.

More particularly, in this embodiment the plurality of optical transmitters 42 includes 160 individual optical transmitters, three of which are shown at 48, 50 and 52 for example. Each of the 160 optical transmitters transmits optical signals at a unique corresponding wavelength or channel, or more particularly, at a corresponding one of 80 wavelengths within a conventional or "C"-band ranging from 1530 nm to 1561 nm, and 80 further wavelengths within a long-wavelength or "L"-band ranging from 1570 nm to 1603 nm. Alternatively, however, other optical transmission systems may be substituted.

In this embodiment each of the optical amplifiers 44 includes an erbium-doped optical fiber amplifier, which serves to amplify optical signals therealong by stimulated emission. Alternatively, other types of optical amplifiers, such as thulium or other rare-earth doped fiber amplifiers, Raman amplification systems, hybrid Raman/rare-earth doped fiber amplification systems, or semiconductor optical amplifiers, for example, may be substituted.

Also in this embodiment, the multiplexer 46 includes a dense wavelength-division multiplexer, operable to transmit all of the signals received from the optical transmitters 42 via the optical amplifiers 44, as wavelength-division multiplexed optical signals on an optical fiber span shown generally at 60.

In this embodiment a number of optical amplifiers, such as those shown at 62, 64 and 66 for example, are interposed at various intervals along the length of the optical fiber span 60. More particularly, in this embodiment such an amplifier is located at approximately every 80 km interval along the optical fiber span 60, and includes an erbium-doped optical fiber amplifier. Alternatively, other types of optical amplifiers may be substituted. As a further alternative, or in addition, if it is desired to provide separate amplification for broad communications bands, which in this embodiment include the C-band and the L-band, or even for individual channels in such bands, each of the amplifiers interposed along the optical fiber span 60 may further include a wavelength-division demultiplexer (not shown) to separate such bands (or alternatively, channels) from each other, a separate amplifier for each separated band (or alternatively, for each separated channel), and a multiplexer (not shown) to re-multiplex the amplified bands (or alternatively, channels) together for further propagation on the optical fiber span 60.

Amplified optical signals propagated along the optical fiber span 60 are then received by the optical receiving system shown generally at 20.

Optical Receiving System

In the present embodiment the optical receiving system 20 includes a separator shown generally at 70 in communication with the optical fiber span 60, for receiving optical signals therefrom. In this embodiment the separator 70 is separated by a distance or spacing 140 from the next upstream optical amplifier, which in this case is the optical amplifier 66.

In the present embodiment, in respect of each of the 160 different wavelengths or channels arriving as the multiplexed optical signals, the separator 70 is configured to separate optical signals in a first wavelength range (or more particularly, signals in the particular channel in question) from other wavelengths, and to communicate to one of the optical amplifiers 30, as the optical signals received at the optical amplifier, the optical signals in the first wavelength range. More particularly, in this embodiment the separator 70 includes a demultiplexer 72 which is configured to demultiplex the optical signals in the first wavelength range from multiplexed optical signals. More particularly still, in this embodiment the demultiplexer 72 is a dense wavelength-division demultiplexer. The separator 70 receives the dense wavelength-division multiplexed signals from the optical fiber span 60, and separates the signals into the individual optical wavelengths or channels transmitted by the plurality of optical transmitters 42, which in this embodiment are the 160 discrete wavelengths of the C-band and the L-band. The separator 70 transmits each one of the separated 160 wavelengths or channels to a respective corresponding one of the optical detectors 22, via a respective corresponding one of the optical amplifiers 30.

Thus, in the present embodiment there are 160 optical amplifiers 30 and 160 corresponding optical detectors 22, each such amplifier-detector pair being used to amplify and receive a unique corresponding wavelength or channel transmitted by a particular corresponding one of the optical transmitters 42.

Figure 3:
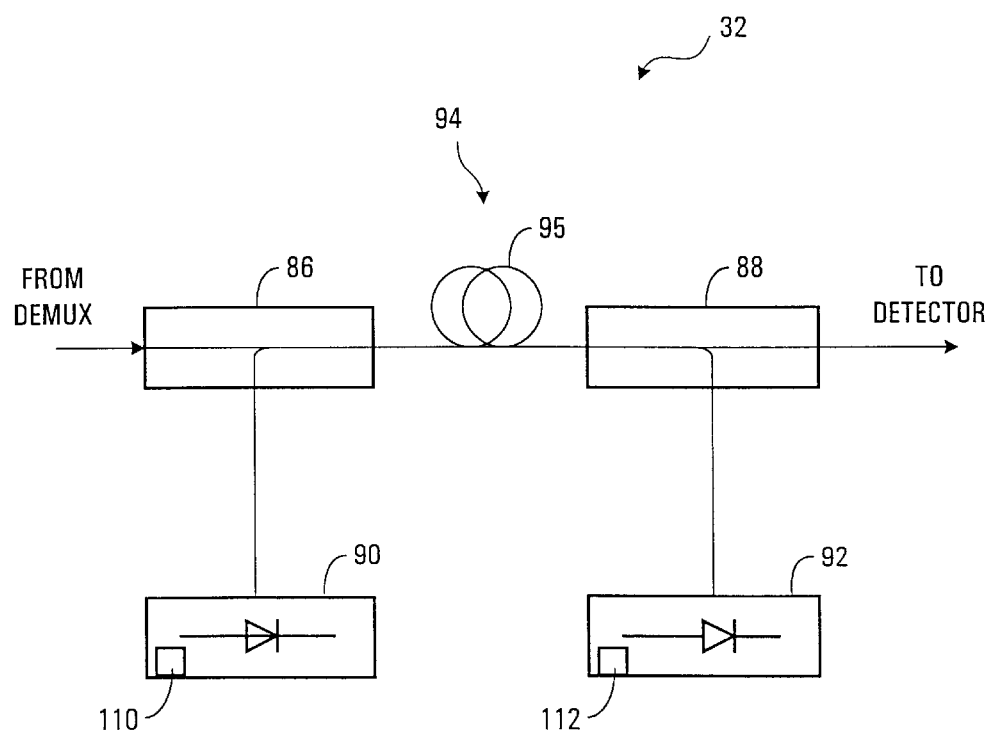
FIG. 3 is a block diagram of an optical amplifier of the receiving system shown in FIG. 2.

Referring to FIGS. 2 and 3, in this embodiment each one of the optical amplifiers 30 is configured to amplify optical signals received at the optical amplifier to produce the amplified optical signals. In this embodiment each of the optical amplifiers 30 includes an erbium-doped fiber amplifier, such as the optical amplifier 32 shown in FIG. 3, described in greater detail below. Alternatively, other types of optical amplifiers may be substituted, such as those mentioned elsewhere herein, for example.

As noted, in this embodiment each of the 160 optical detectors 22 is in unfiltered communication with a corresponding one of the 160 optical amplifiers 30 to receive amplified optical signals therefrom. In the present embodiment each of the optical detectors 22 includes a p-i-n photodiode with high optical power saturation. Alternatively, however, other types of detectors may be substituted if desired.

Optical Amplification

Referring to FIGS. 2 and 3, before describing the operation of the receiving system 20 according to the present embodiment of the invention, it is useful to briefly summarize the operation of the various optical amplifiers employed in both the receiving system and in the network segment 40. In the present embodiment, the plurality of optical amplifiers 44, the optical amplifiers 62, 64 and 66, and the plurality of optical amplifiers 30 function in a similar manner. Accordingly, by way of example, the operation of one of the plurality of optical amplifiers 30 of the receiving system 20, or more particularly of the optical amplifier 32 shown in FIG. 3, is described in greater detail.

In this embodiment the optical amplifier 32 includes first and second multiplexers 86 and 88, first and second pump sources 90 and 92 in communication with the first and second multiplexers respectively, and a photon multiplying portion 94. More particularly still, in this embodiment the photon multiplying portion 94 includes an erbium-doped optical fiber span 95, each of the pump sources 90 and 92 includes a respective diode laser, and each of the multiplexers 86 and 88 includes a directional wavelength-division multiplexer. Additional components, such as isolators for example (which are often provided at the upstream end of optical amplifiers), optical tap couplers, or other components may be provided if desired. Similarly, if desired, a two-stage optical amplifier, effectively similar to a pair of optical amplifiers such as the optical amplifier 32 connected in series, may be substituted. Alternatively, other types of amplifiers may be substituted for the optical amplifier 32 or for any of the other optical amplifiers 30, 44, 62, 64 or 66.

In the present embodiment, optical signals arriving at the optical amplifier 32 from the separator 70 are first received by the first multiplexer 86, which also receives excitation radiation from the pump source 90. The arriving optical signals from the separator 70 and the excitation radiation are simultaneously wavelength-division-multiplexed onto the erbium-doped optical fiber span 95, travelling co-directionally (from left to right as shown in FIG. 3). At the same time, in this embodiment the second multiplexer 88 receives further excitation radiation from the pump source 92, which it transmits onto the optical fiber span 95. In this regard, many choices of a suitable excitation wavelength or wavelengths will be apparent to one of ordinary skill in the art when presented with this specification. For example, erbium ions may be excited by wavelengths typically near 1480 nm and/or 980 nm. The excitation radiation produced by the diode laser pump sources 90 and 92 excites erbium ions within the erbium-doped optical fiber span 95 to metastable states at higher energy levels than their initial ground energy state. To the extent that any residual excitation radiation travels through the optical fiber span 95 without absorption and corresponding excitation of erbium ions, such residual excitation radiation is re-directed by the multiplexers 86 and 88 to respective isolators (not shown) at the locations of the pump sources 90 and 92, where it is discarded.

The arriving optical signals from the separator 70 cause stimulated emission by the excited metastable erbium ions, of additional photons at the same wavelengths as the arriving optical signals, effectively producing a signal gain or amplification of the arriving optical signals, by increasing the number of photons at all wavelengths of the arriving signals. The ions that produce such additional photons drop to a lower energy state, and are then quickly re-excited to a higher energy metastable state by the excitation radiation.

The amplified optical signals, including both the photons that originally arrived from the separator 70 as well as the additional photons at the same wavelengths produced by stimulated emission in the above manner, are transmitted by the second multiplexer 88 along an optical fiber span to the corresponding one of the optical detectors 22, which in the case of the amplifier 32 is the optical detector 24 shown in FIG. 2.

In the present embodiment, the gain level of the optical amplifier 32 may be selected by actuating power controls 110 and 112 of the pump sources 90 and 92 respectively, to cause the pump sources to deliver excitation energy to the optical fiber span 95 at a different power or rate, thereby altering the rate of such stimulated emission and thus altering the amplification or gain of the optical amplifier 32.

In addition to such desired stimulated emissions which produce the desired amplification of the optical signals arriving from the separator 70, a relatively small amount of spontaneous emission by the excited ions tends to occur, whenever erbium ions spontaneously drop to a lower energy state. Such spontaneous emission may occur at any wavelength corresponding to an energy difference between any two discrete energy states of the erbium ions. Due to the large number of permitted spontaneous emission wavelengths, the spontaneous emission distribution is effectively continuous and spans a relatively broad optical bandwidth.

The resulting spontaneously-emitted photons are then amplified, as they cause stimulated emission by excited erbium ions of photons at the same wavelengths as the spontaneously-emitted photons, resulting in amplified spontaneous emission (ASE). These inadvertently-produced ASE wavelengths tend to produce two main sources of noise in the optical signals, a narrow-band noise source and a wide-band noise source. The narrow-band noise source arises because ASE wavelengths in close proximity to the wavelength of the desired optical channel (i.e. the signals arriving from the separator 70) beat with the optical signals in the desired channel itself, producing a source of noise referred to herein as "signal-spontaneous" beat noise. It will be appreciated that this signal-spontaneous beat noise only occurs in a relatively narrow wavelength range surrounding the wavelength of the channel itself.

The wide-band noise source arises due to the tendency of any given ASE wavelength to beat with any other nearby ASE wavelengths, producing a source of noise referred to herein as "spontaneous-spontaneous" beat noise. As ASE wavelengths are produced over a broad range of wavelengths, including wavelengths well outside the desired optical channel, such spontaneous-spontaneous beat noise may occur over a much broader wavelength range than signal-spontaneous beat noise. Any such spontaneous-spontaneous beat noise that occurs within the broad optical bandwidth to which the detector of the receiver is responsive, will produce corresponding beat noise in the equivalent electrical signals produced by the receiver.

Accordingly, to avoid the effects of the latter wide-band spontaneous-spontaneous beat noise, conventional wisdom dictates that there must be a filter interposed between any optical amplifier and the optical detector for a given channel, to prevent any wavelengths other than the desired channel from reaching the optical detector. In accordance with the present embodiment of the invention, however, it has been found that such a filter may be omitted in many circumstances, as discussed in greater detail below.

Operation

Generally, referring back to FIG. 2, in this embodiment each of the optical amplifiers 30 produces amplified optical signals 31 satisfying a filterless detection specification limit. Such signals are received at a respective one of the optical detectors 22 in unfiltered communication with the optical amplifier. If desired, the amplified optical signals may be measured, to confirm the signals satisfy the filterless detection specification limit. If such measurement fails to confirm that the filterless detection specification limit is satisfied, it may be possible to select a physical parameter of the receiving system 20 including the optical amplifiers 30, to cause the amplified optical signals to satisfy the filterless detection specification limit. These aspects are discussed in greater detail below, in the context of the present embodiment.

Referring to FIGS. 2 and 3, in the present embodiment each one of the 160 optical transmitters 42 transmits an optical signal, which in this embodiment is a 10 Gb/s pulsed optical communications signal at a unique wavelength or channel selected from among the 160 wavelengths of the C-band and L-band, to a corresponding one of the optical amplifiers 44. Each of the optical amplifiers 44 amplifies the received optical signal in a manner similar to that described above in connection with the optical amplifier 32 shown in FIG. 3, and transmits the amplified optical signal to the multiplexer 46.

The multiplexer 46 thus receives amplified optical signals at 160 different wavelengths from the optical amplifiers 44, and wavelength-division multiplexes the amplified optical signals onto the optical fiber span 60 for propagation therealong. In addition, although each of the optical amplifiers 44 produces at least some wide-band spontaneous-spontaneous beat noise as discussed above in connection with the amplifier 32, the multiplexer 46 also serves to remove wavelengths other than the 160 wavelengths transmitted by the optical transmitters 42, and therefore removes most such wide-band spontaneous-spontaneous beat noise.

During the course of propagation along the optical fiber span 60, the multiplexed optical signals may pass through a number of optical amplifiers, such as those shown at 62, 64 and 66 in FIG. 2 for example, which in this embodiment are interposed at 80 km intervals along the optical fiber span 60. Each such amplifier amplifies the optical signals in a manner generally similar to that described above in connection with the optical amplifier 32 shown in FIG. 3 (subject to possible separation and separate amplification of the C-band and L-band or channels therein as mentioned above, if desired).

Multiplexed, amplified optical signals are then received at the receiving system 20, or more particularly, at the separator 70, which in this embodiment includes the dense wavelength-division demultiplexer 72. The separator 70 is configured to separate optical signals in each of the 160 wavelength ranges from the other wavelengths, and to communicate to a corresponding optical amplifier, as the optical signals received at the optical amplifier, the optical signals in each such wavelength range. Thus, the separator 70 serves to separate each of the 160 wavelengths or channels, and transmits each channel to a particular corresponding one of the optical amplifiers 30 for amplification and further transmission to a particular corresponding one of the optical detectors 22.

It will be appreciated that the optical amplifiers 62, 64 and 66 along the optical fiber span 60 also inadvertently produce at least some wide-band spontaneous-spontaneous beat noise at wavelengths outside and between those of the 160 optical channels transmitted by the optical transmitters 42. However, in this embodiment the separator 70 serves to filter out wavelengths other than the 160 wavelengths or channels transmitted by the optical transmitters 42, and therefore removes virtually all of the wide-band spontaneous-spontaneous beat noise produced upstream of the separator 70.

Upon arrival of each of the 160 optical wavelengths or channels at the 160 corresponding optical detectors 22, each of the detectors detects the incoming optical signals at the particular corresponding wavelength or channel and produces equivalent electrical signals. It will be appreciated that this electrical detection process tends to introduce undesirable noise, referred to as shot noise, into the electrical signals. Similarly, each optical receiver in which each optical detector is provided further amplifies the equivalent electrical signals, and this electrical amplification process tends to introduce undesirable thermal noise into the amplified electrical signals.

As the shot noise and thermal noise relative to the signal associated with optical-to-electrical signal conversion are inversely proportional to the signal strength of the incoming optical signals, it is desirable to amplify the incoming optical signals prior to arrival at the optical detectors 22, to reduce the relative levels of such shot and thermal noise. The optical amplifiers 62, 64 and 66 preceding the separator 70 are not entirely satisfactory for this purpose, as the amplifier 66 is often as far as 80 km away from the separator 70, and also, the separator 70 is a source of significant insertion loss for the optical signals passing therethrough, due to the large number of filters typically included in the separator.

Therefore, in order to effectively decrease the relative contribution of shot and thermal noise in the resulting electrical signals, it is desirable to provide further optical amplification, between the separator 70 and the optical detectors 22, of each of the 160 optical wavelengths or channels transmitted by the separator 70 to the 160 corresponding optical detectors 22. In the present embodiment, such additional optical amplification is provided by the 160 optical amplifiers 30, each of which is interposed between the separator 70 and a corresponding one of the 160 optical detectors 22.

As discussed above, each of the optical amplifiers 30 tends to produce at least some wide-band spontaneous-spontaneous beat noise, due to nearby ASE wavelengths beating with each other. Most such ASE-ASE beating occurs at optical wavelengths other than the particular wavelength which each particular one of the optical detectors 22 is intended to detect.

Accordingly, conventional wisdom would require a filter to be interposed between each of the optical amplifiers 30 and each corresponding one of the optical detectors 22, to filter out wavelengths other than the wavelength of the particular optical channel which the particular optical detector 22 is being used to detect, in order to prevent the wide-band ASE—ASE beating from producing corresponding spontaneous-spontaneous beat noise in the electrical equivalent signals produced by each detector.

This would pose a complex and costly approach. For example, in the present embodiment, wherein 160 different optical wavelengths or channels are being detected, 160 different corresponding filters would be required, whether provided separately or as part of a unitary receiver module including the filter and the detector. Therefore, manufacturers and suppliers of optical receivers would be required to manufacture and stock 160 different filters or 160 different filtered receiver modules. Similarly, optical network operators would be required to incur the added cost of purchasing 160 different filters (whether provided separately or as part of a receiver module). In addition, as it is typically necessary for optical network operators to keep a spare part on-hand for each component of an optical network, such optical network operators would be required to purchase 160 separate spare filters or alternatively, 160 separate spare receiver modules, each receiver module including an identical optical detector but a different optical filter corresponding to the particular optical channel which the detector is to be used to detect. As the number of optical channels or wavelengths increases in the future with increasing capacity demands, these disadvantages will be further exacerbated.

However, the inventors of the present invention have discovered that contrary to conventional wisdom, such filters may be omitted in many circumstances, thereby avoiding the foregoing disadvantages, without producing significant spontaneous-spontaneous beat noise. Such circumstances are discussed in greater detail below in the case of the present specific embodiment of the invention.

Thus, in the present embodiment for example, each of the optical detectors 22 is locatable in unfiltered communication with a corresponding one of the optical amplifiers 22 to receive amplified optical signals therefrom. Each such optical amplifier is operable to amplify optical signals received at the optical amplifier to produce the amplified optical signals.

Accordingly, the advantages of optical amplification between the separator 70 and the optical detectors 22, including the reduction of shot noise and thermal noise at the detectors, are achieved, without the corresponding disadvantages associated with further filtration of the amplified optical signals prior to detection.

In the present embodiment each of the optical detectors 22 is identical, and is responsive to any optical frequencies in the C-band or the L-band.

However, the separator 70 initially filters out optical signals other than the desired optical wavelength or channel that is to be detected by any given channel, and, as discussed in greater detail below, the presence of the corresponding optical amplifier 30 between the separator 70 and each detector 22 does not produce significant ASE—ASE beating in the present embodiment, and therefore, spontaneous-spontaneous beat noise is not appreciably present. Effectively, therefore, in this embodiment the optical detectors 22, or more particularly the receivers in which they are provided, are interchangeable.

From a manufacturer or supplier's point of view, only a single receiver need be manufactured and stocked. Similarly, from an optical network operator's point of view, the cost of obtaining the 160 receivers in which the 160 optical detectors 22 are provided is reduced, as it is not necessary to incur the added cost of 160 corresponding optical filters. Similarly, such an optical network operator need only maintain a single receiver including a single optical detector as a spare part, as such a receiver will be interchangeable with any one of the 160 receivers in which the 160 optical detectors 22 are provided.

In order to achieve the above-noted advantages and avoid the above-noted disadvantages, in the present embodiment each of the optical amplifiers 30 of the optical receiving system 20 is operable to produce the amplified optical signals 31 (i.e., the amplified optical signals received at the optical detectors 22) satisfying a filterless detection specification limit. More particularly, in this embodiment the system 20 produces the amplified optical signals to satisfy, as the filterless detection specification limit, a pre-defined maximum ratio of spontaneous-spontaneous beat noise to signal-spontaneous beat noise. In this embodiment the maximum ratio of spontaneous-spontaneous beat noise to signal-spontaneous beat noise is on the order of one percent. More particularly still, examples of filterless detection specification limits employed in the present embodiment of the invention are discussed in greater detail below.

Filterless Detection Specification Limits

For the purpose of the present embodiment of the invention, it is useful to derive a filterless detection specification limit which, when satisfied, confirms that the optical detectors 22 may be placed in unfiltered communication with the optical amplifiers 30 without producing levels of spontaneous-spontaneous beat noise that may be unacceptable for a particular application. Such a specification limit is preferably expressed in terms of measurable physical parameters, so that an optical network operator may measure such physical parameters to confirm that unfiltered communication between an optical amplifier and a corresponding optical detector is producing acceptable results in the particular application at hand.

Referring to FIGS. 2 and 3, for the purpose of deriving such a specification limit, any one of the 160 optical wavelengths or channels may be taken as an example. Accordingly, the optical wavelength or channel which is amplified by the optical amplifier 32, to produce amplified optical signals which are then received by the optical detector 24 of the optical receiver 25, is discussed below by way of example.

The total noise in the equivalent electrical signals produced by the optical receiver 25 is assumed to be the sum of the squares of all of the contributing noise sources as follows:

$$\sigma^2 = \sigma^2_{shot} + \sigma^2_{thermal} + \sigma^2_{Sig\_Sp} + \sigma^2_{Sp\_Sp} \quad (1)$$

wherein:

$\sigma^2_{shot}$ represents shot noise occurring at the optical detector 24, resulting from the detection process;

$\sigma^2_{thermal}$ represents thermal noise occurring in the optical receiver 25, resulting from the electrical amplification process;

$\sigma^2_{Sig\_Sp}$ represents signal-spontaneous beat noise, as described above in connection with the optical amplifier 32; and $\sigma^2_{Sp\_Sp}$ represents spontaneous-spontaneous beat noise, also as described above in connection with the optical amplifier 32 and the various other optical amplifiers described herein.

In the present embodiment, to derive a filterless detection specification limit, a number of assumptions may be made. In particular, it is first assumed that the separator 70 effectively removes all wide-band ASE—ASE beating and corresponding spontaneous-spontaneous beat noise caused by optical amplifiers upstream of the separator 70. In other words, it is assumed that the spontaneous-spontaneous beat noise term $\sigma^2_{Sp\_Sp}$ in equation (1) is caused only by the optical amplifiers 30, or in the present example, only by the optical amplifier 32.

In addition, it is assumed that the optical amplifier 32 does not appreciably contribute to signal-spontaneous beat noise arising from narrow-band signal-ASE beating. In this regard, there are typically ten or more optical amplifiers, such as those shown at 62, 64 and 66 in FIG. 2 for example, upstream of the separator 70, and because the signal-ASE beating occurs at the wavelengths of the respective channels which the separator 70 transmits, the separator 70 does not remove such signal-ASE beating. Thus, any additional signal-spontaneous beat noise caused by the optical amplifier 32 is assumed to be negligible compared to the cumulative signal-spontaneous beat noise caused by optical amplifiers upstream of the separator 70. In other words, it is assumed that signal-spontaneous beat noise term $\sigma^2_{Sig\_Sp}$ in equation (1) is caused only by optical amplifiers of the network segment 40 upstream of the separator 70.

In general, a filterless detection specification limit may be stated as follows:

$$\sigma_{Sp\_Sp}^2 \leq (M)(\sigma_{Sig\_Sp}^2) \quad (2)$$

wherein M is a tolerable pre-defined maximum ratio of spontaneous-spontaneous beat noise to signal-spontaneous beat noise. In this embodiment, M is on the order of one percent. More particularly, in this embodiment M equals one percent. In other words, in the present embodiment, the filterless detection specification limit will confirm that the optical amplifier 32 may be placed in unfiltered communication with the optical detector 24, provided the additional wide-band spontaneous-spontaneous beat noise added by the optical amplifier 32 does not exceed 1% of the intrinsic narrow-band signal-spontaneous beat noise that would arrive at the optical detector 24 regardless of any further intervening filtration. Alternatively, however, other maximum ratios, or other filterless detection specification limits, may be substituted if desired, depending on tolerable noise limits of a particular application.

Filterless Detection Specification Limit Assuming General ASE Profile

The left-hand side of the preceding equation, $\sigma^2_{Sig\_Sp}$, may be calculated from the following expression:

$$\sigma^2_{Sp\_Sp} = B_e R^2 \int_{-\infty}^{\infty} |\rho_{ASE}(f)|^2 df \tag{3}$$

wherein:
- $B_e$ is an optical bandwidth to which the optical detector 24 is responsive;
- R represents responsivity of the optical detector 24;
- $\rho_{ASE}(f)$ represents power spectral density of the ASE produced by the optical amplifier 32, as a function of optical frequency f; and
- f denotes optical frequency.

In this regard, it is noted that the validity of the preceding expression assumes that a broad optical bandwidth $B_0$ over which ASE is appreciably produced by the optical amplifier 32 is much greater than the optical bandwidth $B_e$ to which the optical detector 24 is responsive (i.e., assuming $B_0 >> B_e$), and further assumes that the ASE spectrum is smooth and well-behaved, so that a spontaneous-spontaneous relative intensity noise (RIN) spectrum from 0 to $B_e$ is approximately constant.

Turning now to the right-hand side of the filterless detection specification limit in equation (2), if we assume that the power spectral density $\rho_{ASE}$ of the ASE produced by the optical amplifier 32 is constant over the optical bandwidth $B_e$ to which the optical detector 24 is responsive, then the signal-spontaneous beat noise may be expressed as follows:

$$\sigma_{Sig\_Sp}^2 = 2R^2 P_{Sig} \rho_{ASE} B_e \tag{4}$$

wherein:
- $P_{Sig}$ represents optical power of the optical signal, i.e. of the particular optical wavelength or channel which the optical detector 24 is being used to detect.

The power spectral density $\rho_{ASE}$ of the ASE is, by definition, related to ASE power $I_{ASE}$ in a defined optical bandwidth, which can be measured with an optical spectrum analyzer set for the given defined optical bandwidth:

$$I_{ASE} \equiv \rho_{ASE} \Delta f \tag{5}$$

wherein:
- $\Delta f$ denotes a defined reference bandwidth for measuring the ASE power $I_{ASE}$; and
- $I_{ASE}$ represents ASE power in the defined bandwidth $\Delta f$, and is in general (like $\rho_{ASE}$) a function of frequency f; $I_{ASE}$ may be used to place a limit on the power spectral density $\rho_{ASE}$.

In turn, the ASE power $I_{ASE}$ is related to the optical signal-to-noise ratio within the bandwidth of the optical channel which the optical detector 24 is being used to receive:

$$OSNR_{NB} \equiv \frac{P_{Sig}}{I_{ASE\_NB}} \tag{6}$$

wherein:
- $OSNR_{NB}$ is the optical signal-to-noise ratio of the optical channel.

It will be appreciated that $OSNR_{NB}$ is a commonly calculated noise parameter and may often be measured directly using an optical spectrum analyzer preceding the separator 70.

Combining equations (5) and (6) for a common defined bandwidth NB=$\Delta f$ yields:

$$\rho_{ASE\_NB} = \frac{P_{Sig}}{OSNR_{NB} \Delta f} \tag{7}$$

Substituting the preceding expression for $\rho_{ASE}$ into equation (4) yields:

$$\sigma^2_{Sig\_Sp} = \frac{2R^2 P_{Sig}^2 B_e}{OSNR_{NB} \Delta f} \tag{8}$$

Thus, combining equations (8) and (3) into equation (2) yields the following form of expression of the filterless detection specification limit:

$$B_e R^2 \int_{-\infty}^{\infty} |\rho_{ASE}(f)|^2 df \leq (M) \frac{2R^2 P_{Sig}^2 B_e}{OSNR_{NB} \Delta f} \tag{9}$$

Multiplying both sides by ($\Delta f / B_e R^2$) yields:

$$\Delta f \int_{-\infty}^{\infty} |\rho_{ASE}(f)|^2 df \leq (M) \frac{2 P_{Sig}^2}{OSNR_{NB}} \tag{10}$$

In order to render the left-hand side of equation (10) more easily usable in practice, a number of further manipulations may be made. First, it is noted that the total ASE power $P_{ASE}$, which is a readily measurable physical parameter, may be expressed as follows:

$$P_{ASE} = \int_{-\infty}^{\infty} |\rho_{ASE}(f)| df \tag{11}$$

Equation (10) may therefore be re-written as:

$$P_{ASE} \Delta f \frac{\int_{-\infty}^{\infty} |\rho_{ASE}(f)|^2 df}{\int_{-\infty}^{\infty} |\rho_{ASE}(f)| df} \leq (M) \frac{2 P_{Sig}^2}{OSNR_{NB}} \tag{12}$$

Next, the ASE power spectral density $\rho_{ASE}$ may be expressed as a product of its peak value (a constant) and a normalized ASE power spectral density, which ranges from 0 to 1, as a function of optical frequency f:

$$\rho_{ASE}(f) = \rho_{ASE}(\text{peak}) * \rho_{ASEnorm}(f) \tag{13}$$

wherein:
- $\rho_{ASE}(\text{peak})$ is the peak ASE power spectral density; and
- $\rho_{ASEnorm}(f)$ represents a unitless normalized ASE power spectral density function of optical frequency, ranging from 0 to 1.

Substituting (13) into (12) yields:

$$P_{ASE} \Delta f \frac{|\rho_{ASE}(\text{peak})|^2 \int_{-\infty}^{\infty} |\rho_{ASEnorm}(f)|^2 df}{|\rho_{ASE}(\text{peak})| \int_{-\infty}^{\infty} |\rho_{ASEnorm} f)| df} \leq (M) \frac{2 P_{Sig}^2}{OSNR_{NB}} \tag{14}$$

Finally, from equation (5), it is noted that:

$$\Delta f = \frac{I_{ASE}(\text{peak})}{\rho_{ASE}(\text{peak})} \qquad (15)$$

Substituting (15) into (14) thus yields:

$$P_{ASE}I_{ASE}(\text{peak})\int_{-\infty}^{\infty}\frac{|\rho_{ASEnorm}(f)|^2 df}{\int_{-\infty}^{\infty}|\rho_{ASEnorm}(f)|df} \leq (M)\frac{2P_{Sig}^2}{OSNR_{NB}} \qquad (16)$$

Thus, equation (16) provides a filterless detection specification limit which, if satisfied by the amplified optical signals produced by the optical amplifier 32, confirms that the optical amplifier 32 may be placed in unfiltered communication with the optical detector 24, without the resulting spontaneous-spontaneous beat noise exceeding the maximum ratio M of spontaneous-spontaneous beat noise to inherent signal-spontaneous beat noise.

The physical parameters $P_{ASE}$ (total ASE power) and $I_{ASE}$(peak) (peak ASE power) are readily measurable by those of ordinary skill in the art, as is $P_{sig}$ (optical power of the signal) and $OSNR_{NB}$.

Although the third term in the left-hand side of equation (16) may require calculation in some circumstances, in many circumstances such calculation may be avoided by noting that because $0 \leq \rho_{ASEnorm}(f) \leq 1$, this third term is always less than or equal to unity, and therefore, the worst-case scenario (i.e., the lowest tolerable value of the product of total ASE power and peak ASE power) occurs when this third term is equal to unity. (As shown below, this worst-case scenario corresponds to a square ASE profile). Accordingly, if a user wishes to avoid such calculations, the user may assume, as the worst-case scenario, that this third term is equal to unity, for the purpose of confirming that the filterless detection specification limit expressed in equation (16) is satisfied.

As optical power measurements are frequently expressed in logarithmic units, taking $10 \log_{10}( \ldots )$ of both sides of equation (16) yields:

$$P_{ASE}+I_{ASE}(\text{peak})+\Omega \leq 10 \log_{10}(2M) - OSNR_{NB} + 2P_{Sig} \qquad (17)$$

wherein:

$P_{ASE}$, $I_{ASE}$ and $P_{Sig}$ are expressed in dBm (i.e., relative to a 1 mW reference signal);

$OSNR_{NB}$ and $10 \log_{10}(2M)$ are expressed in dB; and $$\Omega = 10\log_{10}\left(\frac{\int_{-\infty}^{\infty}|\rho_{ASEnorm}(f)|^2 df}{\int_{-\infty}^{\infty}|\rho_{ASEnorm}(f)|df}\right).$$

More particularly, in the present embodiment, wherein M=0.01 (i.e., the spontaneous-spontaneous beat noise introduced by the optical amplifier 32 is not permitted to exceed 1% of the inherent signal-spontaneous noise in the channel itself introduced by amplifiers upstream of the separator 70), $10 \log_{10}(2M) = -17$ dB, so that the preceding equation becomes:

$$P_{ASE}+I_{ASE}(\text{peak})+\Omega \leq -17 - OSNR_{NB} + 2P_{Sig} \qquad (18)$$

Filterless Detection Specification Limit Assuming Square ASE Profile

For the filterless detection specification limit expressed in the preceding equations, very little was assumed about the spectral distribution of the ASE produced by the optical amplifier 32. However, the worst-case scenario (i.e. the scenario producing the greatest spontaneous-spontaneous beat noise) is expected to result if the ASE distribution has a square profile, or in other words, if the optical amplifier 32 produces ASE at a constant power spectral density $\rho_{ASE}$ across the entire optical bandwidth $B_0$, and produces no ASE outside the bandwidth $B_0$:

$$\rho_{ASE}(f) = \begin{cases} \rho_{ASE}, & f_0 \leq f \leq f_0 + B_0 \\ 0, & f < f_0, f > f_0 + B_0 \end{cases} \qquad (19)$$

wherein ($f_0$, $f_0 + B_0$) denote the frequency boundaries of the optical bandwidth $B_0$ across which the ASE is non-zero; and $\rho_{ASE}$ is a constant, equal to the constant value of the ASE power spectral density $\rho_{ASE}$ produced by the optical amplifier 32 across the optical bandwidth $B_0$.

In this case, as $\rho_{ASE}(f) = \rho_{ASE}$ (a constant) within the optical bandwidth $B_0$ and zero elsewhere, the expression in equation (3) for the spontaneous-spontaneous beat noise reduces to the following:

$$\sigma_{Sp\_Sp}^2 = B_e R^2 \rho_{ASE}^2 \int_{f_0}^{f_0+B_0} df = B_e R^2 \rho_{ASE}^2 B_0 \qquad (20)$$

Similarly, in this case the expression in equation (11) above for the total ASE power $P_{ASE}$ reduces to the following:

$$P_{ASE} = \rho_{ASE} B_0 \qquad (21)$$

Combining the two preceding equations yields:

$$\sigma_{Sp\_Sp}^2 = \frac{B_e R^2 P_{ASE}^2}{B_0} \qquad (22)$$

Substituting the preceding expression for the spontaneous-spontaneous beat noise and the expression in equation (8) above for the signal-spontaneous beat noise into the filterless detection specification limit in equation (2) yields:

$$\frac{B_e R^2 P_{ASE}^2}{B_0} \leq (M)\frac{2R^2 P_{Sig}^2 B_e}{OSNR_{NB}\Delta f} \qquad (23)$$

Multiplying both sides by $(\Delta f/R^2 B_e)$ yields:

$$\frac{P_{ASE}P_{ASE}\Delta f}{B_0} \leq (M)\frac{2P_{Sig}^2}{OSNR_{NB}} \qquad (24)$$

From equations (21) and (5), $I_{ASE} = \rho_{ASE}\Delta f = P_{ASE}\Delta f/B_0$, and also, it is noted that $I_{ASE} \equiv I_{ASE}(\text{peak})$, the peak ASE power measured in the optical bandwidth $\Delta f$. Therefore, the preceding equation reduces to:

$$P_{ASE}I_{ASE}(peak) \leq (M)\frac{2P_{Sig}^2}{OSNR_{NB}} \quad (25)$$

The preceding filterless detection specification limit may be expressed in logarithmic units as follows:

$$P_{ASE}+I_{ASE}(\text{peak}) \leq 10\ \log_{10}(2M) - OSNR_{NB} + 2P_{Sig} \quad (26)$$

wherein:

PASE, IASE and PSig are expressed in dBm (i.e., relative to a 1 mW reference signal); and $OSNR_{NB}$ and $10\ \log_{10}(2M)$ are expressed in dB.

More particularly, in the present embodiment, wherein M=0.01 (i.e., the spontaneous-spontaneous beat noise introduced by the optical amplifier 32 is not permitted to exceed 1% of the inherent signal-spontaneous noise in the channel itself introduced by amplifiers upstream of the separator 70), $10\ \log_{10}(2M) = -17$ dB, so that the preceding equation becomes:

$$P_{ASE}+I_{ASE}(\text{peak}) \leq -17 - OSNR_{NB} + 2P_{Sig} \quad (27)$$

As expected, the preceding filterless detection specification limit for a square ASE profile corresponds to the filterless detection specification limit expressed in equations (16) to (18) above for a general ASE profile, in the worst-case scenario wherein Ω as defined in equation (17) equals unity.

Thus, the foregoing expressions provide a filterless detection specification limit, in terms of easily measurable physical parameters, namely, the total ASE power $P_{ASE}$, the peak ASE power $I_{ASE}(\text{peak})$, the optical power $P_{SIG}$ of the signal at the wavelength or channel of interest which the detector 24 is being used to receive, and the optical signal-to-noise ratio $OSNR_{NB}$ within the bandwidth of the channel. Optical network operators and manufacturers alike may readily measure these parameters, to determine whether an optical detector may advantageously be placed in unfiltered communication with an optical amplifier in a particular case.

Application to Optical Network Segment

Referring back to FIG. 2, in the present embodiment, the filterless detection specification limit for the worst-case scenario (square ASE profile) expressed in equation (27) above is applied to the optical network segment 40 as follows. In this embodiment, the optical bandwidth Δf of the particular optical channel that the detector 24 is being used to receive is approximately 0.1 nm, which is a frequency span of approximately 12.5 GHz within the C-band or L-band. The optical signal-to-noise ratio $OSNR_{NB}$ in this particular optical channel is conservatively estimated at 27.5 dB. If desired, the optical signal-to-noise ratio $OSNR_{NB}$ may be measured directly using an optical spectrum analyzer 100 in the present embodiment. As the foregoing specification limits were derived on the assumption that the separator 70 and optical amplifier 32 do not appreciably affect signal-spontaneous beat noise and thus do not appreciably affect the value of $OSNR_{NB}$, in the present embodiment the optical spectrum analyzer 100 is connected upstream of the separator 70.

Also in this embodiment, the power of the optical signal in the particular channel arriving at the optical detector 24 is expected to be approximately 8 dBm.

Therefore, in this embodiment, wherein M=0.01 (i.e., wide-band spontaneous-spontaneous beat noise is not permitted to exceed 1% of narrow-band signal-spontaneous beat noise), the filterless detection specification limit expressed in equation (27) becomes:

$$P_{ASE}+I_{ASE}(\text{peak}) \leq -28.5\ \text{dBm} \quad (28)$$

Thus, in the present embodiment, an operator (not shown) of the optical network segment 40 may measure the amplified optical signals to confirm the signals satisfy the filterless detection specification limit. More particularly, this may be achieved by measuring the total ASE power $P_{ASE}$ and the peak ASE power $I_{ASE}$ (in a 0.1 nm bandwidth centered at the wavelength of the optical channel which the detector 24 is being used to receive), using an optical spectrum analyzer 102 connected between the optical amplifier 32 and the optical detector 24, for example. Provided the sum of the total ASE power and the peak ASE power is less than −28.5 dBm, the operator will have confirmed that the optical network segment 40, including the optical amplifier 32, is producing optical signals in the channel of interest that satisfy the foregoing filterless detection specification limit, and will therefore have confirmed that the optical detector 24 may be advantageously placed in unfiltered communication with the optical amplifier 32, without the resulting spontaneous-spontaneous beat noise exceeding 1% (M in the present embodiment) of the signal-spontaneous beat noise inherently present in the optical channel itself regardless of filtration. For example, measurements of total ASE power of −4 dBm and peak ASE power of −25 dBm satisfy the foregoing filterless detection specification limit.

Adjustment of Physical Parameters

Figure 4:
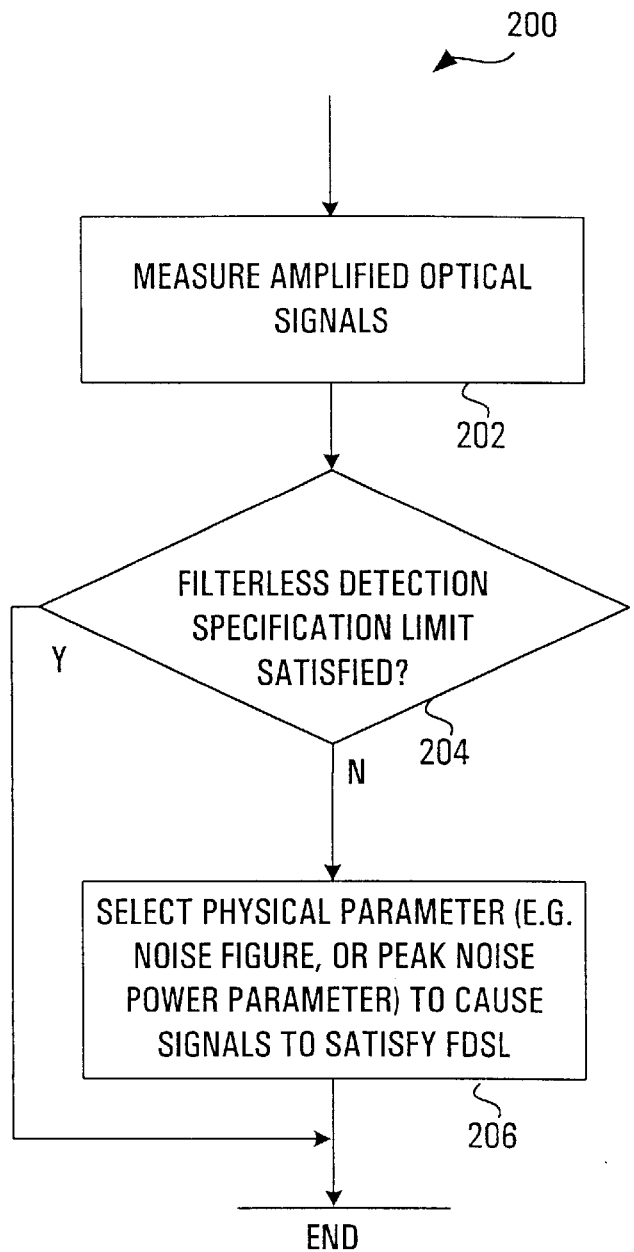
FIG. 4 is a flowchart of an optional design method employable in connection with the optical receiving system shown in FIG. 2.

Referring to FIGS. 2 and 4, a design procedure employable in connection with the present embodiment of the invention is illustrated generally at 200 in FIG. 4.

In this embodiment, the design procedure 200 begins with a first step 202, whereby an optical network operator measures the amplified optical signals 31 produced by the optical amplifier 32. If desired, such measurement may be carried out as described above using the optical spectrum analyzers 100 and 102 shown in FIG. 2 for example. At step 204, the operator compares the results of such measurement with a filterless detection specification limit such as those described herein for example, to determine whether such a filterless detection specification limit is satisfied.

If, in a given case, an optical network operator determines at step 204 that an applicable filterless detection specification limit is not satisfied, then at step 206, the optical network operator adjusts or selects one or more physical parameters of the system 20, to cause the amplified optical signals received at the optical detector 24 to satisfy the filterless detection specification limit. In this regard, it may not always be possible to select a particular physical parameter to cause the desired result. For example, typically, the noise figure of an optical amplifier cannot be less than 3 dB, the optical bandwidth cannot be less than the signal bandwidth, and peak ASE noise density cannot be less than thermal radiation. Nevertheless, a number of physical parameters of the system 20 may often be adjusted or selected to cause the amplified optical signals to satisfy the filterless detection specification limit. By way of example, two such physical parameters are described in further detail below.

Noise Figure

Referring to FIGS. 3 and 4, a noise figure of the optical amplifier 32 shown in FIG. 3 may be selected at step 206 to cause the amplified optical signals it produces to satisfy the filterless detection specification limit. More particularly, reducing the noise figure of the amplifier tends to assist in causing the amplified optical signals to satisfy the specification limit. In this regard, reduction of the noise figure of an optical amplifier may be achieved in a number of ways.

For example, if in a particular embodiment only a counter-directional pump source (such as the pump source 92) were provided, then the addition of an additional co-directional pump source and corresponding wavelength division multiplexer (such as the pump source 90 and multiplexer 86) tends to reduce the noise figure of the optical amplifier.

Alternatively, the noise figure of an optical amplifier may be reduced by removing lossy components, such as isolators, tap couplers, wavelength-division multiplexers for example, that lie upstream of the photon multiplying portion of the amplifier.

Figure 5:
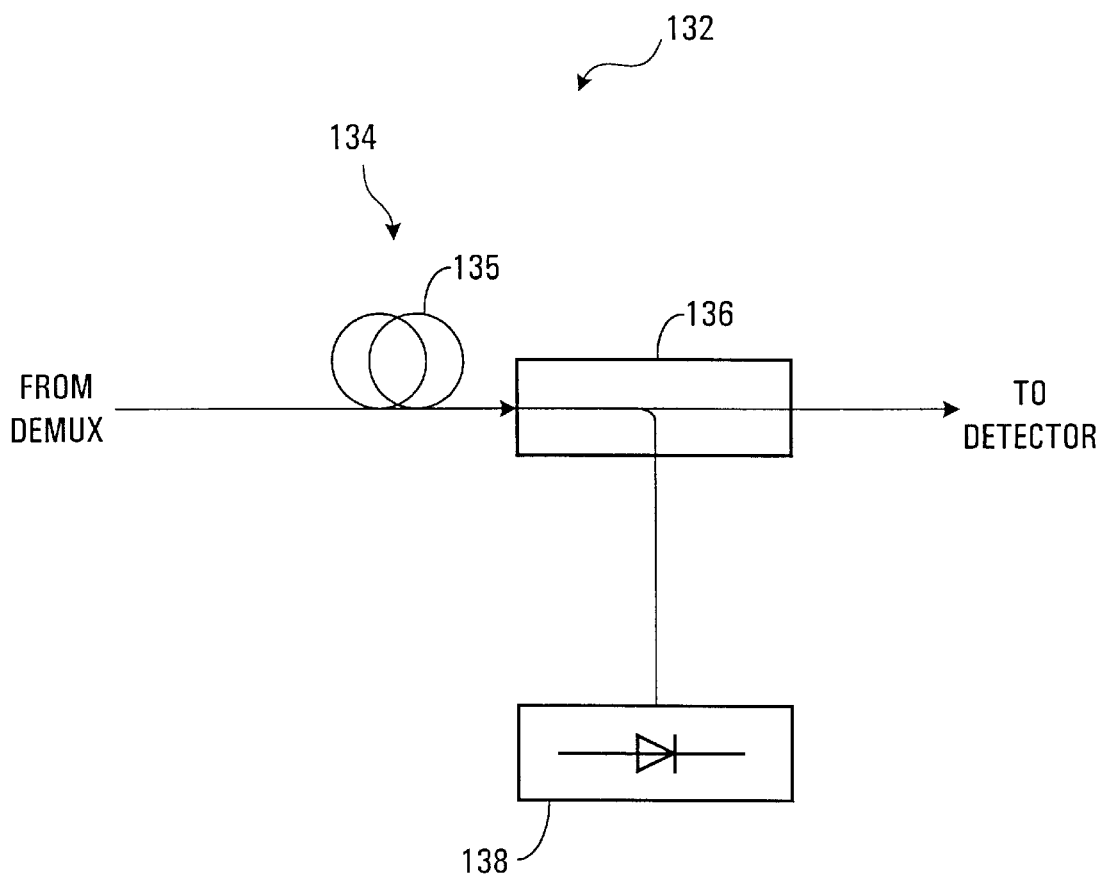
FIG. 5 is a block diagram of an optical amplifier of an optical receiving system according to a third embodiment of the invention.

For example, referring to FIGS. 3 and 5, an optical amplifier according to an alternative embodiment of the invention is shown generally at 132 in FIG. 5. In this embodiment, the optical amplifier 132 includes a photon multiplying portion 134, a multiplexer 136 and a counter-directional pump source 138. More particularly in this embodiment the photon multiplying portion 134 includes an erbium-doped optical fiber span 135, the multiplexer 136 includes a directional wavelength-division multiplexer, and the pump source 138 includes a diode laser. The pump source 138 has a significantly higher pump power than the corresponding pump source 92 shown in FIG. 3. In addition, the erbium-doped optical fiber span 135 is significantly shorter than the erbium-doped optical fiber span 95 shown in FIG. 3. In this regard, it has been found that the removal of the multiplexer (a lossy component) upstream of the erbium-doped optical fiber span tends to reduce the noise figure of the optical amplifier 132, and the corresponding loss of co-directional pump power is partly compensated for by the increased pump power of the pump source 138. If desired, an optical amplifier such as that shown at 132 in FIG. 5 may be provided as the first (upstream) stage of a two-stage optical amplifier, which may include an optical amplifier such as that shown at 32 in FIG. 3 as its downstream stage, if desired. Alternatively, if desired, other components such as isolators may be added or substituted or other modifications may be made, or other types of amplifiers with reduced noise figures may be substituted.

ASE Peak Reduction

Alternatively, or in addition, referring to FIGS. 3 and 4, a peak noise power parameter of the optical amplifier 32 may be selected at step 206 to cause the amplified optical signals it produces to satisfy the filterless detection specification limit. In this regard, it will be appreciated that reducing the peak ASE power $I_{ASE}$ in the defined bandwidth $\Delta f$ directly reduces the left-hand side of the filterless detection specification limits discussed above, and therefore assists in causing the amplified signals produced by the optical amplifier 32 to satisfy the specification limit.

In this regard, referring back to FIG. 3, the peak noise power parameter, or more particularly the peak ASE power $I_{ASE}$, may be selected in a number of ways. For example, the erbium-doped optical fiber span 95 may be modified by changing its rare-earth dopant content, either in concentration, or in type (e.g., thulium), or both. By way of example, an increase in rare-earth dopant content, such as erbium concentration, may either increase or decrease the peak ASE power, depending on other conditions. For example, if the fiber at issue is very long, then for a given pump power, increasing erbium concentration will tend to reduce the average inversion, and increase the peak ASE power. Alternatively, selecting the peak noise power parameter may involve other variations of type and/or dopant concentration of a wide range of rare-earth doped optical fibers.

As a further alternative, the peak ASE power $I_{ASE}$ may be selected by switching the pump sources 90 and/or 92 to another available pump wavelength. In this regard, it will be appreciated that the most convenient pump wavelengths for erbium-doped amplifiers include 980 nm (which may be easily produced by high power semiconductor pump lasers) and 1480 nm (which is quite close to typical signal bands and therefore has very good power conversion efficiency). Of these two typical pump wavelengths, 980 nm tends to produce the lowest peak ASE power. Alternatively, however, pump wavelengths other than 980 nm or 1480 nm may be substituted.

Or, as a further alternative, the fiber spectroscopy of the erbium-doped optical fiber span 95 may be modified. For example, this may be achieved by changing the fiber glass host, in order to modify the ASE spectrum. By way of illustration, alumno-silicate glass fiber results in a different ASE/gain spectrum than germano-silicate glass fiber. Such variations in the fiber glass host provide a convenient way of minimizing the peak ASE power for a given application. Alternatively, other ways of modifying the fiber spectroscopy of the fiber span may be substituted.

Or, as a further example, a filter (not shown) may be provided in the optical amplifier itself if desired, to reduce the peak ASE power $I_{ASE}$. If such a filter is provided, it is preferably provided at a mid-stage of a two-stage optical amplifier, to avoid disadvantages associated with additional filtration upstream or downstream of the amplifier (for example, additional filtration upstream of the photon multiplying portion of the amplifier increases insertion loss and thereby increases the noise figure of the amplifier, whereas additional post-amplification filtering tends to result in inefficient output power loss, which either partially defeats the purpose of signal amplification or requires greater amplification power to compensate). However, it is noted that this approach reduces flexibility of the receiving system 20, as the amplifiers 30 cease to be easily interchangeable if individual per-channel filtering is provided within the amplifiers.

More generally, other ways of selecting the peak noise power parameter may be substituted if desired.

Alternatives

Although specific filterless detection specification limits have been described above, other specification limits may be substituted if desired.

For example, referring back to FIG. 2, in deriving the preceding specification limits expressed in equations (16) and (25), it was assumed that the separator 70 effectively removes any spontaneous-spontaneous beat noise resulting from wide-band ASE produced by amplifiers upstream of the separator 70, such as the amplifiers 62, 64 and 66 for example. Alternatively, however, spontaneous-spontaneous beat noise resulting from residual ASE that is not blocked by the separator 70 may be explicitly considered if desired, in which case the right-hand side of equations (16) and (25) becomes:

$$(M)\frac{2P_{Sig}^2}{OSNR_{NB}}\left[1+\frac{B_S}{2OSNR_{NB}\Delta f}\right] \quad (29)$$

wherein $B_S$ denotes an optical bandwidth of a filter of the separator 70 used to separate the channel of interest from other optical channels.

Typically, the correction factor in the square brackets in the preceding equation will be small. For example, if $OSNR_{NB}$=20 dB, $\Delta f$=0.1 nm and $B_S$=0.5 nm in a particular embodiment, then the correction factor affects the resulting specification limit by approximately 2.5%.

Alternatively, other filterless detection specification limits may be substituted.

More generally, while specific embodiments of the invention have been described and illustrated, such embodiments should be considered illustrative of the invention only and not as limiting the invention as construed in accordance with the accompanying claims.

What is claimed is:

1. An optical receiving method comprising:
    producing amplified optical signals satisfying a filterless detection specification limit, at an optical amplifier; and
    receiving said amplified optical signals at an optical detector in unfiltered communication with said optical amplifier.

2. The method of claim 1 wherein receiving comprises receiving said amplified optical signals from a plurality of optical amplifiers, at a plurality of optical detectors, each of said optical detectors in unfiltered communication with a respective one of said optical amplifiers.

3. The method of claim 1 wherein producing comprises amplifying optical signals received at said optical amplifier.

4. The method of claim 3 further comprising:
    separating optical signals in a first wavelength range from other wavelengths; and
    communicating to said optical amplifier, as said optical signals received at said optical amplifier, said optical signals in said first wavelength range.

5. The method of claim 4 wherein separating comprises demultiplexing said optical signals in said first wavelength range from multiplexed optical signals.

6. The method of claim 1 further comprising measuring said amplified optical signals to confirm said signals satisfy a filterless detection specification limit.

7. The method of claim 1 wherein producing comprises producing said amplified optical signals to satisfy, as said filterless detection specification limit, a pre-defined maximum ratio of spontaneous-spontaneous beat noise to signal-spontaneous beat noise.

8. The method of claim 7 wherein said maximum ratio is on the order of one percent.

9. The method of claim 1 wherein producing comprises producing said amplified optical signals to satisfy, as said filterless detection specification limit, a limit of the form:

$$(P_{ASE})(I_{ASE}(peak)) \leq \frac{2P_{Sig}^2 M}{OSNR_{NB}}$$

wherein:
    $P_{ASE}$=a total amplified spontaneous emission power of the amplified optical signals;
    $I_{ASE}$(peak)=a peak amplified spontaneous emission power of the amplified optical signals in a defined bandwidth $\Delta f$;
    $P_{SIG}$=a total optical power of the amplified optical signals;
    M=a pre-defined maximum ratio of spontaneous-spontaneous beat noise to signal-spontaneous beat noise of the amplified optical signals; and
    $OSNR_{NB}$=an optical signal-to-noise ratio in the defined bandwidth $\Delta f$.

10. The method of claim 1 wherein producing comprises producing said amplified optical signals to satisfy, as said filterless detection specification limit, a limit of the form:

$$(P_{ASE})(I_{ASE}(peak))\frac{\int_{-\infty}^{\infty}|\rho_{ASE[normalized]}(f)|^2 df}{\int_{-\infty}^{\infty}|\rho_{ASE[normalized]}(f)|df} \leq \frac{2P_{Sig}^2 M}{OSNR_{NB}}$$

wherein:
    $P_{ASE}$=a total amplified spontaneous emission power of the amplified optical signals;
    $I_{ASE}$(peak)=a peak amplified spontaneous emission power of the amplified optical signals in a defined bandwidth $\Delta f$;
    $\rho_{ASE[normalized]}$=a unitless normalized amplified spontaneous emission spectral density with value $0 \leq \rho_{ASE[normalized]} \leq 1$, such that an amplified spontaneous emission spectral density $\rho_{ASE}(f)=[\rho_{ASE}(peak)][\rho_{ASE[normalized]}(f)]$
    $P_{SIG}$=a total optical power of the amplified optical signals;
    M=a pre-defined maximum ratio of spontaneous-spontaneous beat noise to signal-spontaneous beat noise of the amplified optical signals; and
    $OSNR_{NB}$=an optical signal-to-noise ratio in the defined bandwidth $\Delta f$.

11. The method of claim 1 wherein producing comprises selecting a physical parameter of a system comprising said optical amplifier, to cause said amplified optical signals to satisfy said filterless detection specification limit.

12. The method of claim 11 wherein selecting comprises selecting a noise figure of said optical amplifier.

13. The method of claim 11 wherein selecting comprises selecting a peak noise power parameter of said optical amplifier.

14. An optical receiving system comprising:
    an optical amplifier operable to produce amplified optical signals satisfying a filterless detection specification limit; and
    an optical detector locatable in unfiltered communication with said optical amplifier to receive said amplified optical signals therefrom.

15. The system of claim 14 wherein said optical detector comprises a plurality of optical detectors, each locatable in unfiltered communication with a respective one of a plurality of optical amplifiers, to receive amplified optical signals therefrom.

16. The system of claim 14 wherein said amplifier is operable to amplify optical signals received at said optical amplifier to produce said amplified optical signals.

17. The system of claim 16 further comprising a separator configured to separate optical signals in a first wavelength range from other wavelengths, and to communicate to said optical amplifier, as said optical signals received at said optical amplifier, said optical signals in said first wavelength range.

18. The system of claim 17 wherein said separator comprises a demultiplexer configured to demultiplex said optical signals in said first wavelength range from multiplexed optical signals.

19. The system of claim 14 wherein said system is configured to produce said amplified optical signals to satisfy, as said filterless detection specification limit, a pre-defined maximum ratio of spontaneous-spontaneous beat noise to signal-spontaneous beat noise.

20. The system of claim 19 wherein said maximum ratio is on the order of one percent.

21. The system of claim 14 wherein said system is configured to produce said amplified optical signals to satisfy, as said filterless detection specification limit, a limit of the form:

$$(P_{ASE})(I_{ASE}(peak)) \leq \frac{2P_{Sig}^2 M}{OSNR_{NB}}$$

wherein:

$P_{ASE}$=a total amplified spontaneous emission power of the amplified optical signals;

$I_{ASE}$(peak)=a peak amplified spontaneous emission power of the amplified optical signals in a defined bandwidth $\Delta f$;

$P_{SIG}$=a total optical power of the amplified optical signals;

M=a pre-defined maximum ratio of spontaneous-spontaneous beat noise to signal-spontaneous beat noise of the amplified optical signals; and $OSNR_{NB}$=an optical signal-to-noise ratio in the defined bandwidth $\Delta f$.

22. The system of claim 14 wherein system is configured to produce said amplified optical signals to satisfy, as said filterless detection specification limit, a limit of the form:

$$(P_{ASE})(I_{ASE}(peak)) \frac{\int_{-\infty}^{\infty} |\rho_{ASE[normalized]}(f)|^2 df}{\int_{-\infty}^{\infty} |\rho_{ASE[normalized]}(f)| df} \leq \frac{2P_{Sig}^2 M}{OSNR_{NB}}$$

wherein:

$P_{ASE}$=a total amplified spontaneous emission power of the amplified optical signals;

$I_{ASE}$(peak)=a peak amplified spontaneous emission power of the amplified optical signals in a defined bandwidth $\Delta f$;

$\rho_{ASE[normalized]}$=a unitless normalized amplified spontaneous emission spectral density with value $0 \leq \rho_{ASE[normalized]} \leq 1$, such that an amplified spontaneous emission spectral density $\rho_{ASE}(f) = [\rho_{ASE}(peak)][\rho_{ASE[normalized]}(f)]$ $P_{SIG}$=a total optical power of the amplified optical signals;

M=a pre-defined maximum ratio of spontaneous-spontaneous beat noise to signal-spontaneous beat noise of the amplified optical signals; and $OSNR_{NB}$=an optical signal-to-noise ratio in the defined bandwidth $\Delta f$.

23. The system of claim 14 wherein a physical parameter of said system is selected to cause said amplified optical signals to satisfy said filterless detection specification limit.

24. The system of claim 23 wherein said physical parameter comprises a noise figure of said optical amplifier.

25. The system of claim 23 wherein said physical parameter comprises a peak noise power parameter of said optical amplifier.

26. An optical receiving system comprising:

means for producing amplified optical signals satisfying a filterless detection specification limit; and means for receiving said amplified optical signals, in unfiltered communication with said means for producing.

* * * * *